US007692607B2

(12) United States Patent
Kao et al.

(10) Patent No.: US 7,692,607 B2
(45) Date of Patent: Apr. 6, 2010

(54) APPARATUS AND METHOD FOR ADJUSTING IMAGE ON THE BASIS OF CHARACTERISTICS OF DISPLAY SYSTEM

(75) Inventors: Hsu-Pin Kao, Pingjhen (TW); Yi-Sheng Yu, Taoyuan (TW); Yi-Chia Shan, Jhongli (TW); Tsan-Hung Tsai, Sanchong (TW)

(73) Assignee: Marketech International Corp., Taipei City (TW)

( * ) Notice: Subject to any disclaimer, the term of this patent is extended or adjusted under 35 U.S.C. 154(b) by 916 days.

(21) Appl. No.: 11/453,929

(22) Filed: Jun. 16, 2006

(65) Prior Publication Data

US 2007/0126661 A1 Jun. 7, 2007

(30) Foreign Application Priority Data

Dec. 7, 2005 (TW) ............................ 94143067 A

(51) Int. Cl.

| | |
|---|---|
| ***G09G 3/28*** | (2006.01) |
| ***G09G 3/10*** | (2006.01) |
| ***H04N 5/202*** | (2006.01) |
| ***H04N 9/64*** | (2006.01) |
| ***H04N 5/16*** | (2006.01) |
| ***H04N 9/097*** | (2006.01) |

(52) U.S. Cl. ............................ 345/63; 345/60; 345/61; 348/254; 348/256; 348/258; 348/259; 315/169.4

(58) Field of Classification Search .................. 345/63, 345/60–61; 348/254, 256, 258–259; 315/169.4
See application file for complete search history.

(56) References Cited

U.S. PATENT DOCUMENTS

| | | | | |
|---|---|---|---|---|
| 2001/0035850 | A1 * | 11/2001 | Okamoto et al. | 345/77 |
| 2005/0068265 | A1 * | 3/2005 | Joo et al. | 345/60 |
| 2005/0231446 | A1 * | 10/2005 | Lee et al. | 345/63 |
| 2006/0038748 | A1 * | 2/2006 | Chiu et al. | 345/60 |

* cited by examiner

*Primary Examiner*—Sumati Lefkowitz
*Assistant Examiner*—Jonathan Horner
(74) *Attorney, Agent, or Firm*—Birch, Stewart, Kolasch & Birch, LLP

(57) ABSTRACT

A method for adjusting an image on the basis of characteristics of a display system is provided. The image includes M horizontal lines. Each of the M horizontal lines respectively includes N pixels. Each pixel has an original gray level. A look-up table previously stores a plurality of conversion coefficients related to the characteristics of the display system. The method first calculates an ith loading according to the N original gray levels of the N pixels in the ith horizontal line. Based on the ith loading, an ith conversion coefficient corresponding to the ith loading is selected from the plurality of conversion coefficients in the look-up table. The method respectively multiplies the N original gray levels of the N pixels in the ith horizontal line by the ith conversion coefficient to generate N new gray levels for the N pixels in the ith horizontal line, whereby the image is adjusted.

20 Claims, 8 Drawing Sheets

APPARATUS AND METHOD FOR ADJUSTING IMAGE ON THE BASIS OF CHARACTERISTICS OF DISPLAY SYSTEM

BACKGROUND OF THE INVENTION

1. Field of the Invention

This invention is generally relative to methods and apparatuses for image processing. More specifically, this invention relates to methods and apparatuses for adjusting an image on the basis of the characteristics of a display system.

2. Description of the Prior Art

A plasma display panel (PDP) consists of millions of lighting cells regularly arranged as a matrix. Typically, the lighting cells disposed on the same horizontal line are serially connected to and jointly share a horizontal electrode set consists of a scan electrode and a sustain electrode. Each of the lighting cells is selectively corresponding to one color among red, green, and blue. With the power provided by the horizontal electrode set, gas in the lighting cells discharges electricity and accordingly generates ultraviolet. The fluorescent powder in the lighting cells is then excited by the ultraviolet to selectively generate visible red light, green light, or blue light. Furthermore, by controlling an address electrode for each of the lighting cells, the brightness of one lighting cell can be independently adjusted. That is to say, by controlling the horizontal electrode set and the address electrode, the brightness of one lighting cell can be adjusted.

As described above, all the power of the lighting cells disposed on the same horizontal line is provided by one horizontal electrode set. The power loading for the horizontal electrode set varies with the number of lighting cells being turned on. Through measurements, it can be found that when all the lighting cells on the same horizontal line are turned on, the loading for the corresponding horizontal electrode set is highest. If the power provided from one horizontal electrode set to the lighting cells is fixed, the power provided to one lighting cell is less when the number of lighting cells being turned on is larger. Hence, when more lighting cells on the same horizontal line are turned on, the brightness of the lighting cells is lower. If the loadings of two adjacent horizontal electrode sets are different, the brightness of the two corresponding horizontal lines is also different even all the gray levels of the pixels on the two horizontal lines are the same. Besides, variances in brightness due to loading variations for red lighting cell, green lighting cell, and blue lighting cell are different. Thus, the colors of the two adjacent horizontal lines are different, too. When the loadings of two adjacent horizontal electrode sets are more different, the brightness and colors of the two corresponding horizontal lines differ more from each other. This phenomenon is called loading effect of PDPs. If the loading effect is serious, people can see an obvious horizontal boundary on a PDP screen, hence the quality of an image displayed on the PDP screen is lowered.

Various techniques have been developed for lessening the loading effect of PDPs. For example, changing the structure of a PDP to reducing current and using electrodes with lower resistances to decreasing voltage drops both can lessen the loading effect of the PDPs. Another technique also useful for lessening the loading effect is increasing the driving ability of horizontal electrode sets or changing relative driving waveforms. However, these prior arts are all difficult from the viewpoints of implementation and cost.

SUMMARY OF THE INVENTION

To solve the aforementioned problems, this invention provides methods and apparatuses for adjusting an image on the basis of the characteristics of a display system. The methods and apparatuses according to this invention previously measures the brightness of the lighting cells connected to the same horizontal electrode set under various loading conditions. That is to say, this invention previously finds out the relationship between loading and brightness. Next, based on the measurement results, this invention establishes a look-up table of loading and brightness compensation. When an image is inputted into the display system, the methods and apparatuses according to this invention first estimates the loading to be formed for every horizontal electrode set. Subsequently, one brightness gain corresponding to the loading can be selected from the look-up table. By respectively multiplying the gray levels of the pixels in every horizontal line one corresponding brightness gain, the image is adjusted and the loading effects of PDP can be lessened.

In this invention, an input image is assumed to include M horizontal lines, and each horizontal line respectively includes N pixels. M and N are both positive integers. Moreover, each pixel in the input image has an original gray level.

One preferred embodiment according to this invention is an adjusting method. In this embodiment, a plurality of compensation coefficients relative to the characteristics of a display system are previously measured and stored in a first look-up table. The adjusting method sequentially or simultaneously processes the M horizontal lines. i is an integer index ranging from 1 to M. The adjusting method first calculates an ith loading according to the N original gray levels of the N pixels in the ith horizontal line. Then, based on the ith loading, the adjusting method selects an ith compensation coefficient corresponding to the ith loading from the plurality of compensation coefficients in the first look-up table. Subsequently, the adjusting method respectively multiplies the N original gray levels of the N pixels in the ith horizontal line by the ith compensation coefficient to generate N compensated gray levels for the N pixels in the ith horizontal line.

The other preferred embodiment according to this invention is an adjusting apparatus including a first look-up table and a compensating module. The first look-up table stores a plurality of conversion coefficients related to the characteristics of a display system. The compensating module further includes a loading calculating module, a first selecting module, and a first multiplying module. The compensating module is used for processing the ith horizontal line among the M horizontal lines, wherein i is an integer index ranging from 1 to M. The loading calculating unit calculates an ith loading corresponding to the ith horizontal line according to the N original gray levels of the N pixels in the ith horizontal line. The first selecting unit selects an ith compensation coefficient corresponding to the ith loading from the plurality of compensation coefficients in the first look-up table. The first multiplying unit respectively multiplies the N original gray levels of the N pixels in the ith horizontal line by the ith compensation coefficient to generate N compensated gray levels for the N pixels in the ith horizontal line.

The advantage and spirit of the invention may be understood by the following recitations together with the appended drawings.

BRIEF DESCRIPTION OF THE APPENDED DRAWINGS

DETAILED DESCRIPTION OF THE INVENTION

This invention provides methods and apparatuses for adjusting an image on the basis of the characteristics of a display system.

Take a plasma display panel (PDP) including M horizontal electrode sets as an example. Each of the horizontal electrode sets is connected to N lighting cells. M and N are positive integers. Furthermore, this invention assumes that an input image includes M horizontal lines and each of the horizontal lines includes N pixels. Each pixel in the input image has an original gray level. The loading for every horizontal electrode set can be defined as the sum of the N original gray levels of the N pixels corresponding to the N lighting cells connected to the horizontal electrode set.

The methods and apparatuses according to this invention previously measures the brightness of the lighting cells connected to one horizontal electrode set under various loading conditions. That is to say, this invention previously finds out the relationship between loading and brightness. Next, based on the measurement results, this invention establishes a look-up table of loading and brightness compensation. Please refer to Table 1, which illustrates an example of the look-up table. In this example, the loading of one horizontal electrode set is set as 100% when all the lighting cells connected to the horizontal electrode set are turned on to a maximum brightness. As shown in Table 1, when the loading of the horizontal electrode set is higher, the actual brightness of the lighting cells is lower. Accordingly, the horizontal electrode set needs a larger brightness gain when its loading is higher.

TABLE 1

Look-up table of loadings and brightness gains

| Loading | Measured Brightness | Brightness Gain |
|---|---|---|
| 100% | 74.21 | 1.000 |
| 80% | 74.54 | 0.996 |
| 70% | 74.98 | 0.990 |
| 60% | 75.71 | 0.980 |
| 50% | 76.25 | 0.973 |

TABLE 1-continued

Look-up table of loadings and brightness gains

| Loading | Measured Brightness | Brightness Gain |
|---|---|---|
| 40% | 76.95 | 0.964 |
| 30% | 77.41 | 0.959 |
| 20% | 77.98 | 0.952 |
| 10% | 78.49 | 0.945 |

If the display system is a P-bits display system capable of displaying $2^P$ gray levels, one horizontal electrode set may have ($2^P$*N) kinds of loadings, wherein P is a positive integer. Correspondingly, the plural compensation coefficients can then include ($2^P$*N) different compensation coefficients. Table 1 is just an example and does not show all possible loadings and brightness gains.

Figure 1:
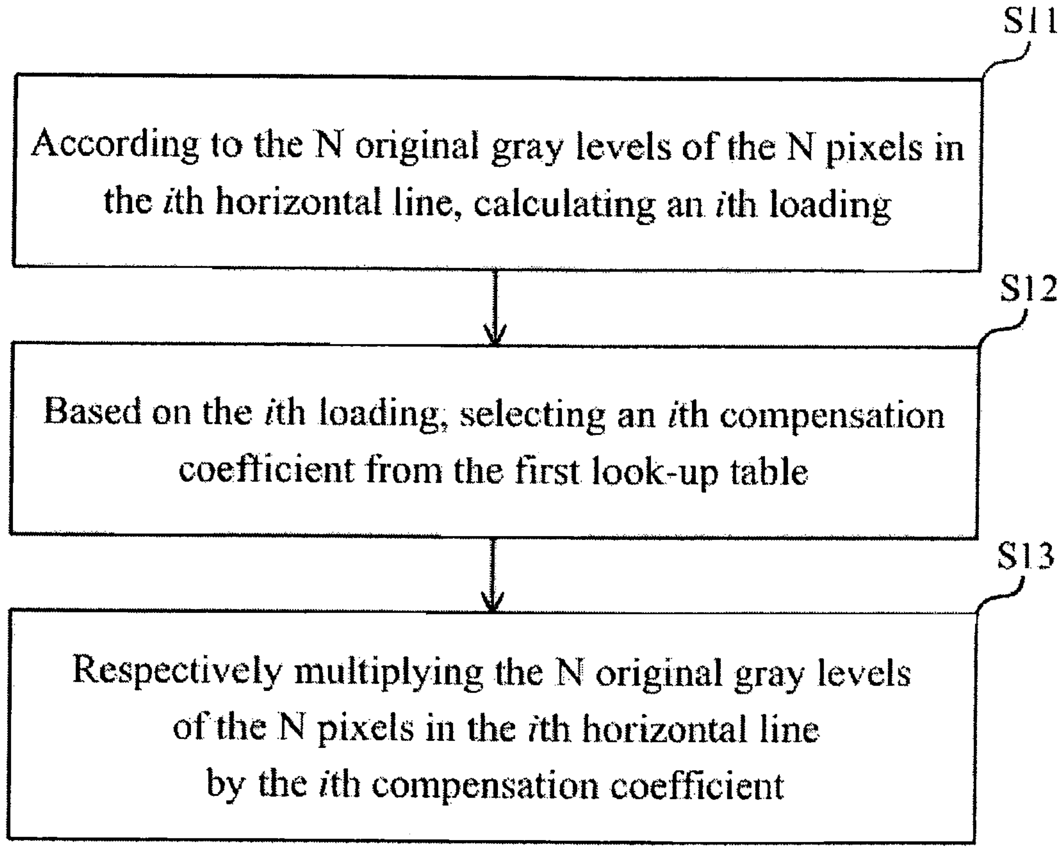
FIG. 1 is the flowchart of the adjusting method according to the first preferred embodiment of this invention.

The first preferred embodiment of this invention is an image adjusting method. In this embodiment, a plurality of compensation coefficients related to the characteristics of the display system is previously stored in a first look-up table. The compensation coefficients are equivalent to the brightness gains in Table 1. Please refer to FIG. 1, which illustrates the flowchart of this image adjusting method. i is an integer index ranging from 1 to M. This method can sequentially or simultaneously process the ith horizontal line among the M horizontal lines. Step S11 is calculating an ith loading according to the N original gray levels of the N pixels in the ith horizontal line. In actual applications, the ith loading can be calculated by summing up the N original gray levels of the N pixels in the ith horizontal line. Step S12 is selecting an ith compensation coefficient corresponding to the ith loading from the plurality of compensation coefficients in the first look-up table. Step S13 is respectively multiplying the N original gray levels of the N pixels in the ith horizontal line by the ith compensation coefficient to generate N compensated gray levels for the N pixels in the ith horizontal line. By replacing the original gray level with the compensated gray level for each pixel in the input image, the input image is adjusted.

In actual application, each of the lighting cells in the display system is selectively corresponding to one color among red, green, and blue. Accordingly, each pixel in the input image is selectively a red pixel, a green pixel, or a blue pixel.

Besides to show images, a display system also has to present correct colors. Hence, lots of image processing methods and apparatuses usually have the function of white balance. White balance is adjusting the brightness of every color with the same gray scale, so as to make the brightness ratio of all the colors conform to a specific specification. In this way, the color temperatures and color deviations of the white colors with various gray levels are kept in a particular range.

The image adjusting method can also further include a step of white balance. The second preferred embodiment of this invention is an image adjusting method with white balance. In this embodiment, a second look-up table is used for storing a plurality of sets of balancing coefficients related to the characteristics of the display system. Each set of the balancing coefficients includes a red balancing coefficient, a green balancing coefficient, and a blue balancing coefficient. Please refer to FIG. 2, which illustrates the flowchart of this method. Steps S21 through S23 are the same as steps S11 through S13. Step S24 is selecting an ith set of balancing coefficients corresponding to the ith loading from the plurality of sets of balancing coefficients in the second look-up table based on the ith loading calculated in step S21. Step S25 is respectively multiplying the compensated gray levels of the red pixels in the ith horizontal line by the red balancing coefficient in the ith set of balancing coefficients, respectively multiplying the compensated gray levels of the green pixels in the ith horizontal line by the green balancing coefficient in the ith set of balancing coefficients, and respectively multiplying the compensated gray levels of the blue pixels in the ith horizontal line by the blue balancing coefficient in the ith set of balancing coefficients. After being multiplied by the balancing coefficients, the compensated gray levels are adjusted to comply with the brightness ratios of white balance. Table 2 shows an example of the second look-up table.

TABLE 2

Look-up table of loadings and balancing coefficients

| Loading | Red Balancing Coefficient | Green Balancing Coefficient | Blue Balancing Coefficient |
|---|---|---|---|
| 100% | 0.767 | 1.000 | 0.845 |
| 80% | 0.783 | 1.000 | 0.845 |
| 70% | 0.791 | 1.000 | 0.853 |
| 60% | 0.798 | 1.000 | 0.853 |
| 50% | 0.806 | 1.000 | 0.853 |
| 40% | 0.806 | 1.000 | 0.860 |
| 30% | 0.806 | 1.000 | 0.860 |
| 20% | 0.798 | 1.000 | 0.868 |
| 10% | 0.783 | 1.000 | 0.868 |

Figure 2:
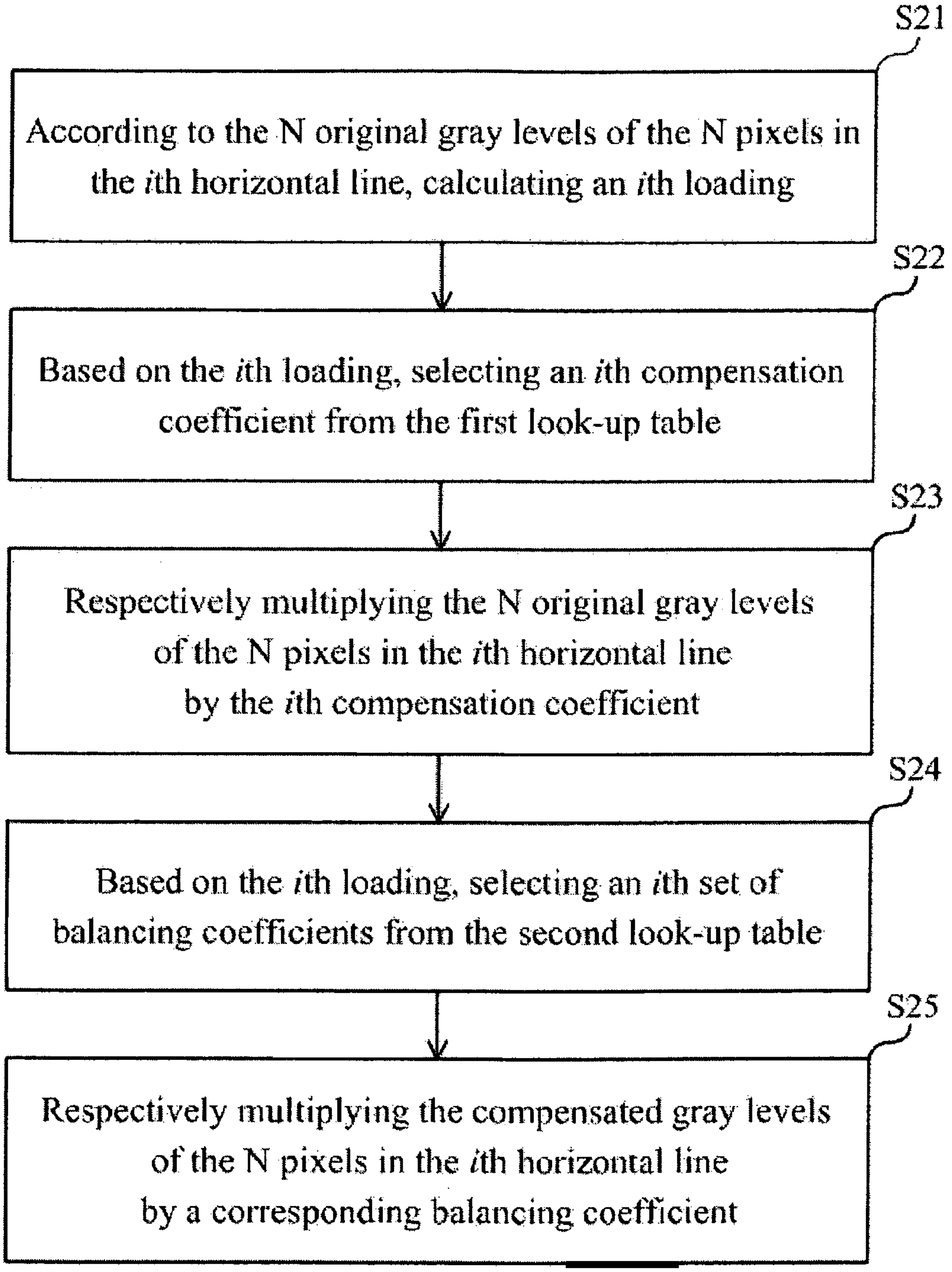
FIG. 2 is the flowchart of the adjusting method according to the second preferred embodiment of this invention.

In actual applications, the sequence for performing the steps in FIG. 2 can be changed to S21, S24, S25, S22, and S23; the results are the same. Furthermore, the second look-up table can be combined into the first look-up table. The compensation coefficients in the first look-up table can be previously multiplied by the balancing coefficients. That is to say, by respectively multiplying the compensation coefficients by the corresponding red balancing coefficient, green balancing coefficient, and blue balancing coefficient can generate a set of new compensation coefficients. Each set of new compensation coefficients includes a red compensation coefficient, a green compensation coefficient, and a blue compensation coefficient. A third look-up table can be used for storing the plural sets of new compensation coefficients.

For example, assume the compensation coefficient corresponding to a first loading in the first look-up table is equal to 0.998. Furthermore, the red balancing coefficient, green balancing coefficient, and blue balancing coefficient corresponding to the first loading in the second look-up table are X, Y, and Z, respectively. According to this invention, in the third look-up table, the red compensation coefficient corresponding to the first loading is 0.998*X, the green compensation coefficient corresponding to the first loading is 0.998*Y, and the blue compensation coefficient corresponding to the first loading is 0.998*Z. By combining brightness compensation and white balance, the method according to this invention can diminish one multiplication step.

Typically, the brightness and gray levels of video signals transferred from TV stations or DVD players have a Gamma 0.45 relation. In actual applications, before compensating the brightness of the original gray levels of an input image, a reverse Gamma conversion must be performed on the original gray levels. This conversion is also called Gamma 2.2 conversion. With the reverse Gamma conversion, the original gray level and the brightness of each pixel can have a respective linear relation. This linear relation facilitates subsequent calculations and hardware implementations.

Oppositely, if the input signal was performed the reverse Gamma conversion, after the brightness compensating process according to this invention, a brightness linearity Gamma conversion must be performed on the compensated gray level of each pixel in the input image, such that the compensated gray level and the brightness of each pixel has a respective linear relation.

The reason for setting all the brightness gains smaller than or equal to 1 in Table 1 is to prevent the compensated gray levels from overflow. Overflow means a gray level is larger than the maximum gray level can be displayed by the display system. Once an overflow occurs, the brightness performance of the image is reduced. However, setting the brightness gains smaller than or equal to 1 decreases the whole brightness of the image. To solve this problem, this invention can further include a contrast extending step. The contrast extending step is selecting a maximum compensation coefficient from the M compensation coefficients corresponding to the M horizontal lines, and respectively dividing each compensated gray level of the pixels in the input image by the maximum compensation coefficient. In this way, the compensated gray levels will not be amplified to a saturation value and the whole brightness of the image is not reduced.

In some display systems, input images are amplified to show more accurate and detailed gray levels. For example, a 8-bits image can be amplified to a 12-bits image when a reverse Gamma conversion is performed. If an image is amplified when inputting into the display system, after the brightness compensating process according to this invention is performed, the image must be recovered to a smaller one by an error diffusion process.

Figure 3:
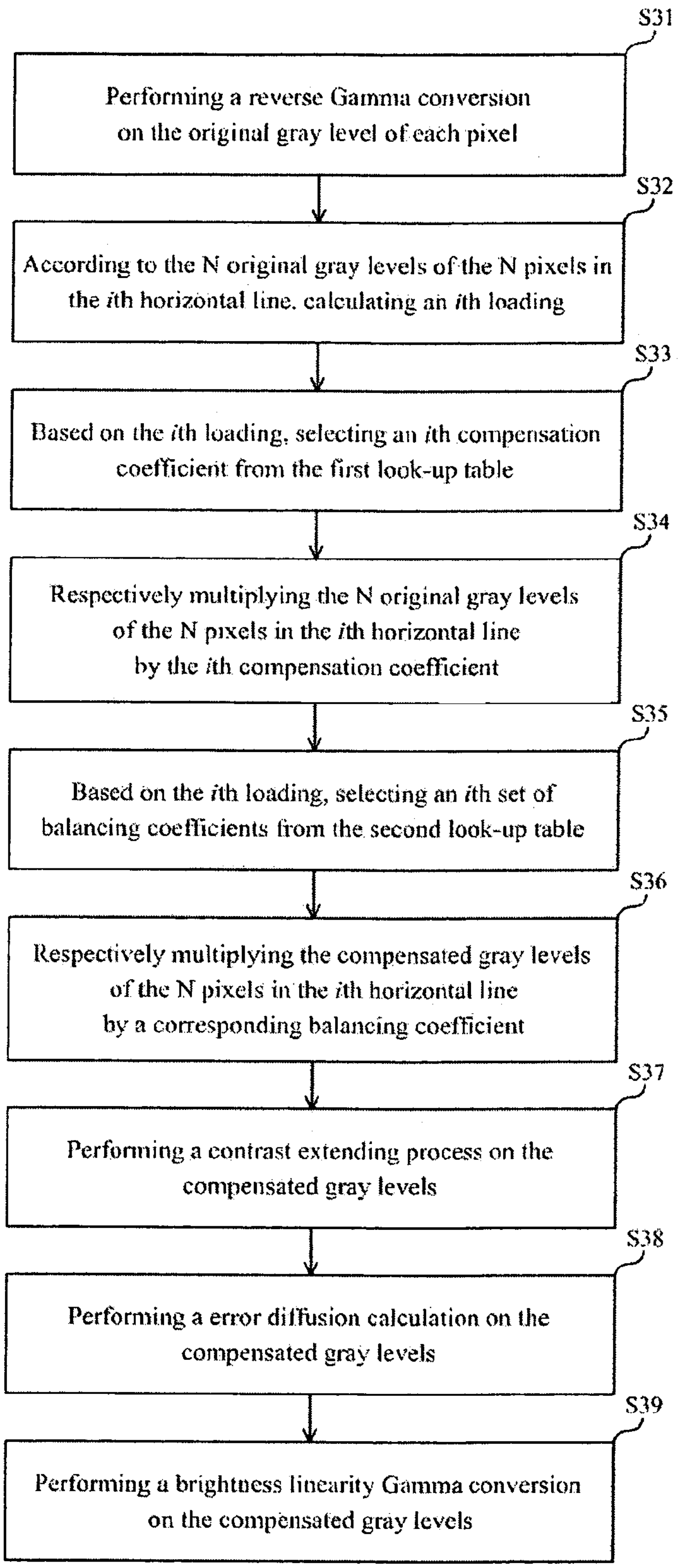
FIG. 3 is the flowchart of the adjusting method according to the third preferred embodiment of this invention.

FIG. 3 illustrates the flowchart of the adjusting method according to the third preferred embodiment of this invention. This embodiment includes all the aforementioned steps of brightness compensating, white balance, Gamma converting, contrast extending, error diffusion, and brightness linearity Gamma conversion.

Figure 4:
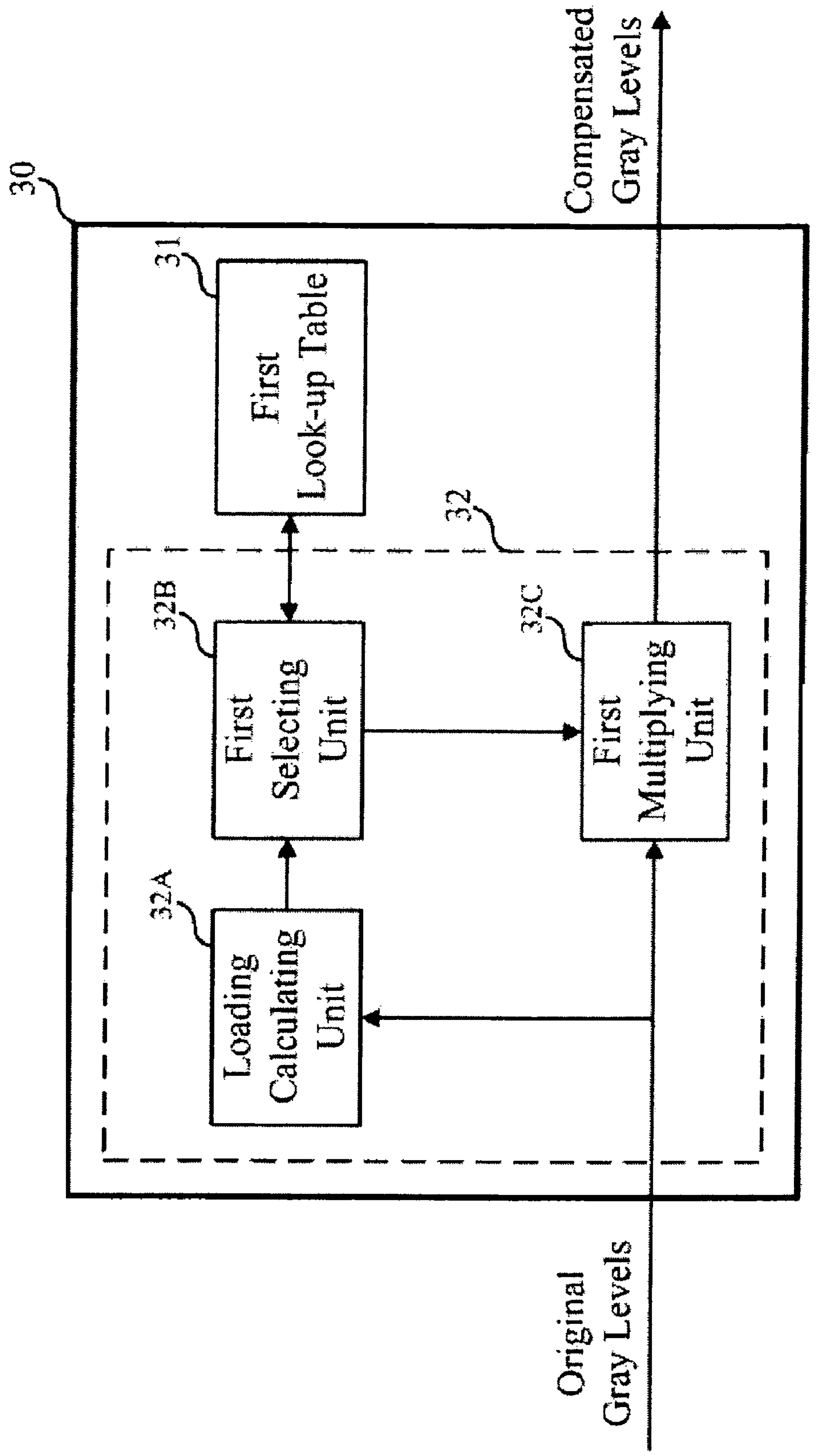
FIG. 4 is the block diagram of the adjusting apparatus according to the fourth preferred embodiment of this invention.

The fourth preferred embodiment according to this invention will be described with reference to a block diagram shown in FIG. 4. The image adjusting apparatus 30 includes a first look-up table 31 and a compensating module 32. The first look-up table 31 stores a plurality of compensation coefficients related to the characteristics of a display system. The compensating module 32 is used for processing the ith horizontal line among the M horizontal lines, wherein i is an integer index ranging from 1 to M. The compensating module 32 includes a loading calculating unit 32A, a first selecting unit 32B, and a first multiplying unit 32C. The loading calculating unit 32A calculates an ith loading corresponding to the ith horizontal line according to the N original gray levels of the N pixels in the ith horizontal line. The first selecting unit 32B is used for selecting an ith compensation coefficient corresponding to the ith loading from the plurality of compensation coefficients in the first look-up table 31. The first multiplying unit 32C respectively multiplies the N original gray levels of the N pixels in the ith horizontal line by the ith compensation coefficient to generate N compensated gray levels for the N pixels in the ith horizontal line. By replacing the original gray level with the compensated gray level for each pixel in the input image, the input image is adjusted.

Figure 5:
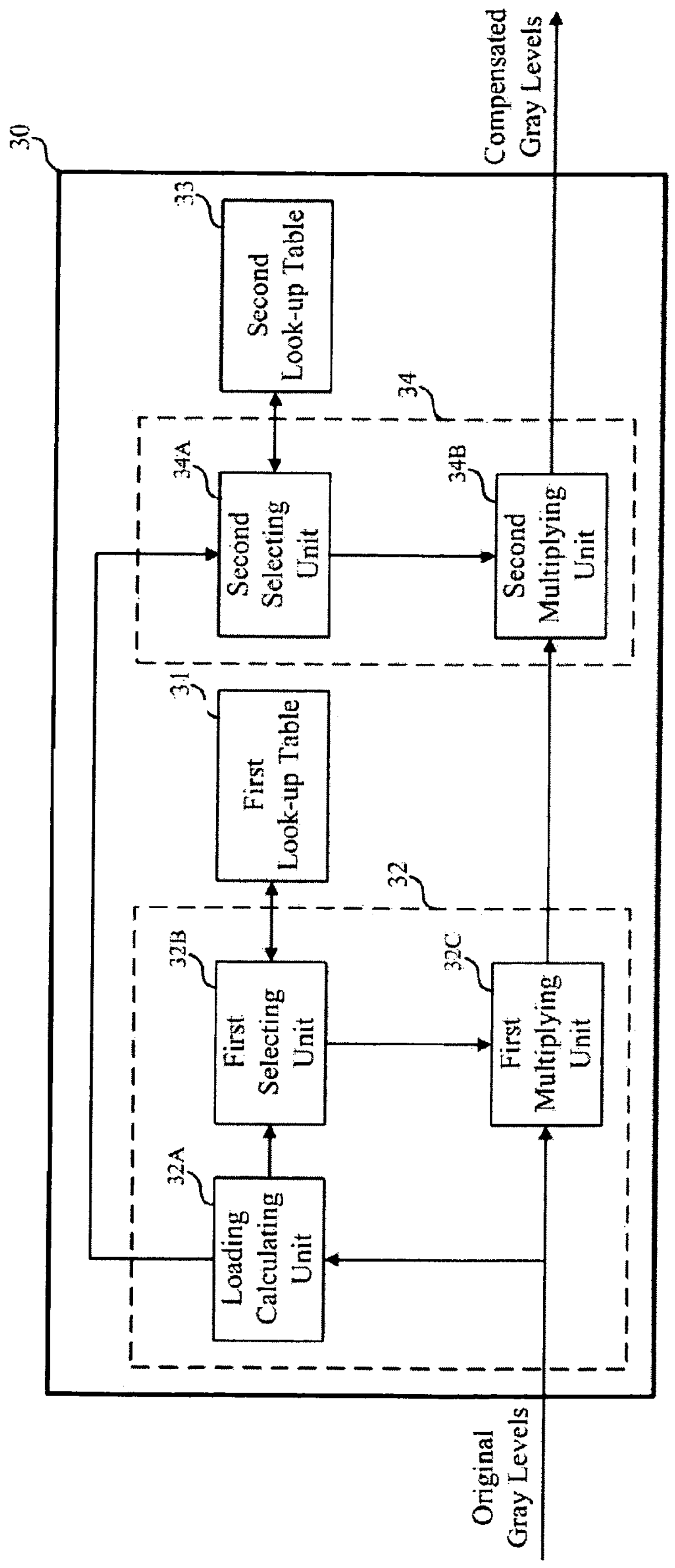
FIG. 5 is the block diagram of the adjusting apparatus according to the fifth preferred embodiment of this invention.

Please refer to FIG. 5, which illustrates the block diagram of the fifth preferred embodiment according to this invention. In this embodiment, the image adjusting apparatus 30 further includes a second look-up table 33 and a balancing module 34 for white balance. The second look-up table 33 stores plural sets of balancing coefficients related to white balance. Each set of the balancing coefficients respectively includes a red balancing coefficient, a green balancing coefficient, and a blue balancing coefficient. The balancing module 34 includes a second selecting unit 34A and a second multiplying unit 34B. The second selecting unit 34A is used for selecting an ith set of balancing coefficients corresponding to the ith loading from the plural sets of balancing coefficients in the second look-up table 33. The second multiplying unit 34B is used for respectively multiplying the compensated gray levels of the red pixels in the ith horizontal line by the red balancing coefficient in the ith set of balancing coefficients, respectively multiplying the compensated gray levels of the green pixels in the ith horizontal line by the green balancing coefficient in the ith set of balancing coefficients, and respectively multiplying the compensated gray levels of the blue pixels in the ith horizontal line by the blue balancing coefficient in the ith set of balancing coefficients.

Figure 6:
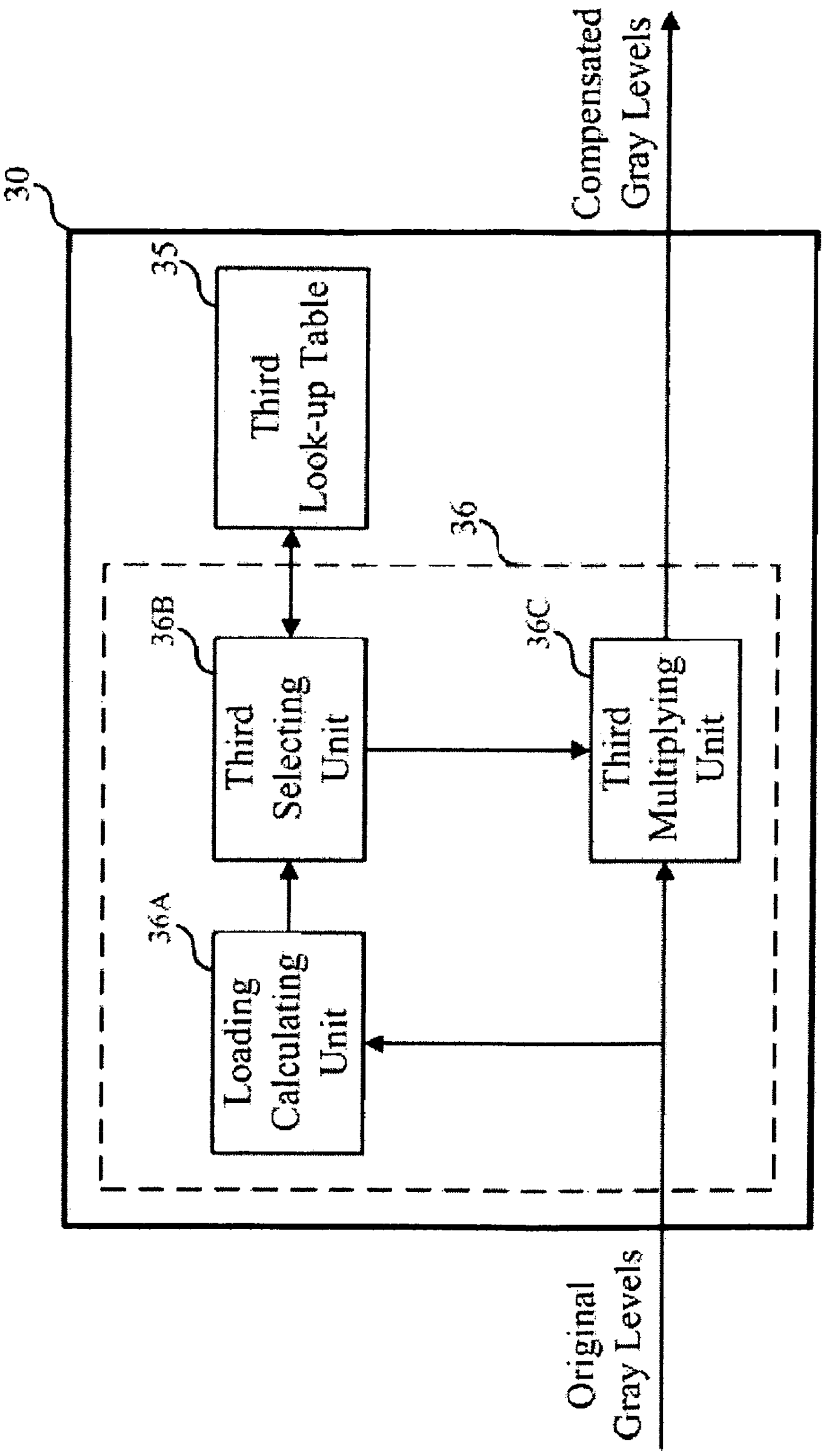
FIG. 6 is the block diagram of the adjusting apparatus according to the sixth preferred embodiment of this invention.

Please refer to FIG. 6, which illustrates the block diagram of the sixth preferred embodiment according to this invention. In this embodiment, the look-up tables and multiplication for brightness compensation and white balance are combined. As shown in FIG. 6, the image adjusting apparatus 30 includes a third look-up table 35 and a compensating module 36. The third look-up table 35 stores plural sets of compensation coefficients related to the characteristics of said display system. Each set of the compensation coefficients respectively includes a red compensation coefficient, a green compensation coefficient, and a blue compensation coefficient. The compensating module 36 includes a loading calculating unit 36A, a third selecting unit 36B, and a third multiplying unit 36C. The loading calculating unit 36A is used for calculating an ith loading corresponding to the ith horizontal line according to the N original gray levels of the N pixels in the ith horizontal line. The third selecting unit 36B selects an ith set of compensation coefficients corresponding to the ith loading from the plural sets of compensation coefficients in the third look-up table 35. The third multiplying unit 36C is used for respectively multiplying the original gray levels of the red pixels in the ith horizontal line by the red compensation coefficient in the ith set of compensation coefficients, respectively multiplying the original gray levels of the green pixels in the ith horizontal line by the green compensation coefficient in the ith set of compensation coefficients, and respectively multiplying the original gray levels of the blue pixels in the ith horizontal line by the blue compensation coefficient in the ith set of compensation coefficients.

Figure 7:
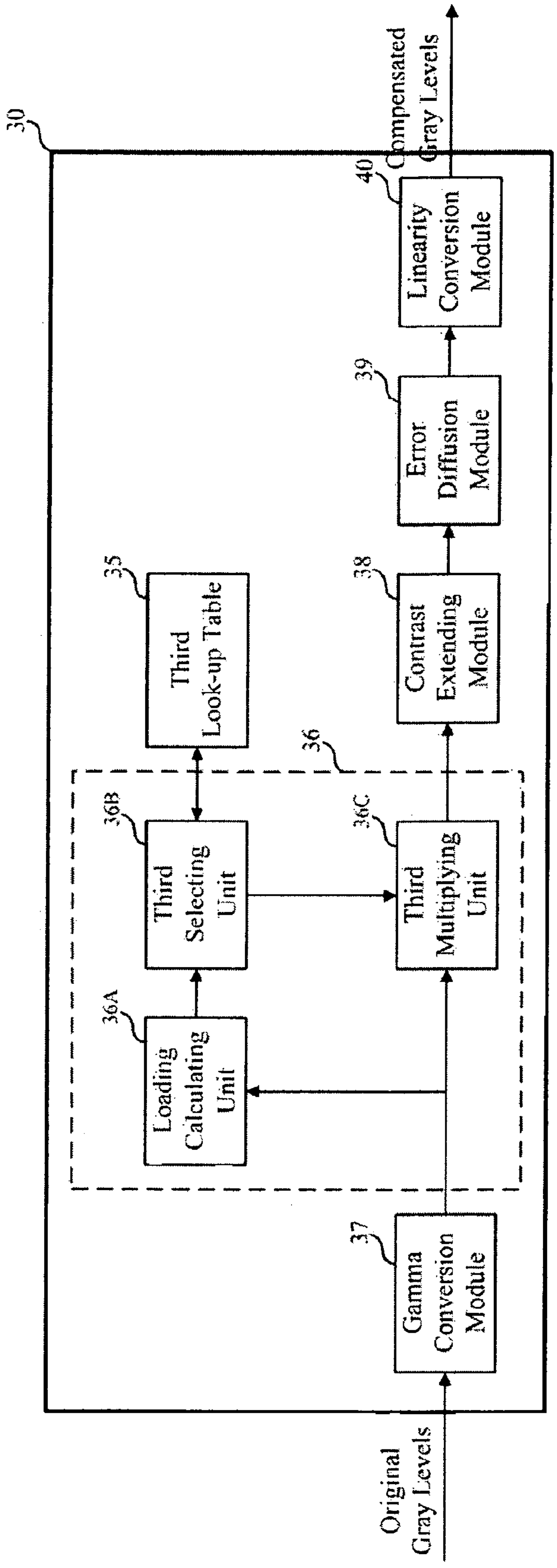
FIG. 7 is the block diagram of the adjusting apparatus according to the seventh preferred embodiment of this invention.

Please refer to FIG. 7, which illustrates the block diagram of the seventh preferred embodiment according to this invention. In this embodiment, besides the third look-up table 35 and the compensating module 36, the image adjusting apparatus 30 further includes a Gamma conversion module 37, a contrast extending module 38, an error diffusion module 39, and a linearity conversion module 40. The Gamma conversion module 37 performs a reverse Gamma conversion on the original gray level of each pixel in the input image, such that the original gray level and the brightness of each pixel has a respective linear relation. The contrast extending module 38 first selects a maximum compensation coefficient from the M compensation coefficients corresponding to the M horizontal lines. Subsequently, the contrast extending module 38 divides each compensated gray level of the pixels in the input image by the maximum compensation coefficient. The error diffusion module 39 is used for respectively performing an error diffusion process on each compensated gray level of the pixels in the input image. The linearity conversion module 40 performs a brightness linearity Gamma conversion on the compensated gray level of each pixel in the input image, such that the compensated gray level and the brightness of each pixel has a respective linear relation.

Figure 8:
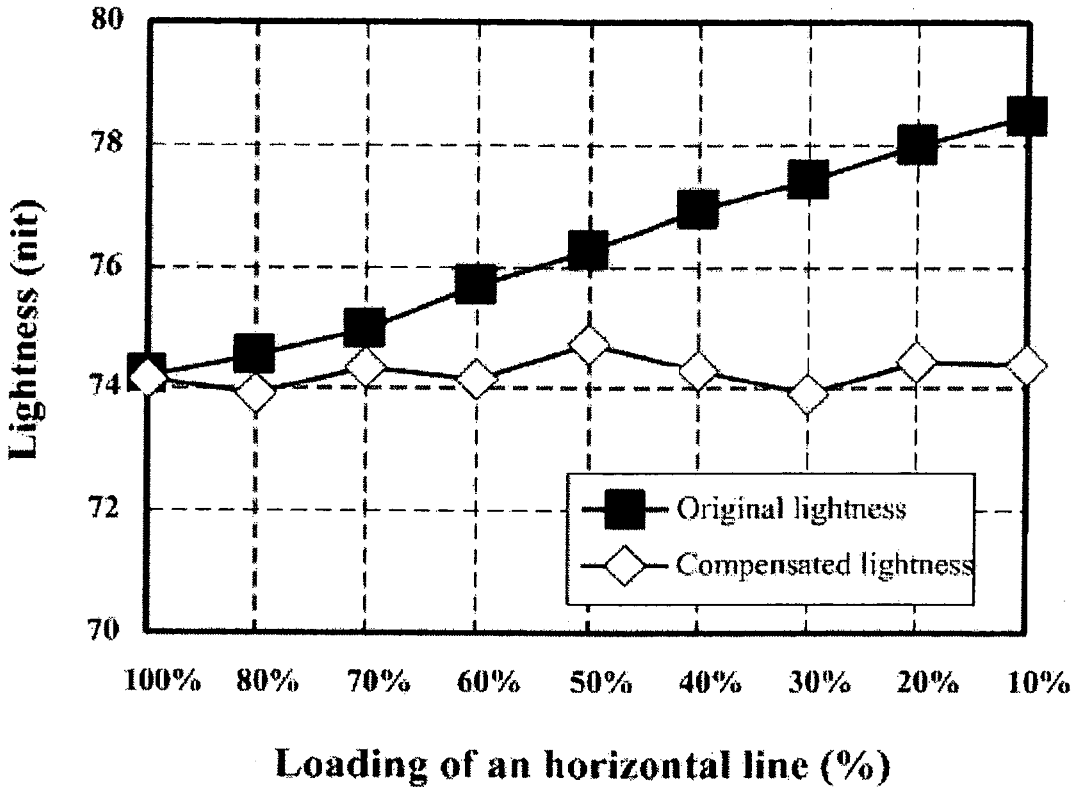
FIG. 8 shows the experimental results according to this invention.

Referring to FIG. 8, an experimental result according to this invention is shown. In this experiment, the brightness of the lighting cells connected to one horizontal electrode set under various loading conditions is measured. The horizontal axis represents the loading of the horizontal electrode set; the vertical axis represents the brightness of the brightness of the lighting cells connected to the horizontal electrode set. The two lines shown in FIG. 8 represent the original brightness and the compensated brightness, respectively. Obviously, after the compensating process proposed in this invention, the compensated brightness is more unified. That is to say, this invention can effectively lessen loading effects of PDP.

As explained above, by adjusting the gray levels of the pixels in an image, this invention can effectively reduce the problems induced by PDP loading effects. This embodiment can also combine the steps of brightness compensating, white balance, Gamma converting, contrast extending, error diffusion, and linearity converting, so as to provide a complete image processing process.

With the above example and explanation, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for adjusting an input image on the basis of characteristics of a display system, said input image comprising M horizontal lines, each of the M horizontal lines respectively comprising N pixels, M and N being positive integers, each pixel in the input image having an original gray level, a first look-up table being used for storing a plurality of compensation coefficients related to the characteristics of said display system, said method comprising the steps of:

(a) processing the M horizontal lines, i being an integer index ranging from 1 to M, when processing the ith horizontal line among the M horizontal lines, performing the following sub-steps:

(a1) according to the N original gray levels of the N pixels in the ith horizontal line, calculating an ith loading;

(a2) based on the ith loading, selecting an ith compensation coefficient corresponding to the ith loading from the plurality of compensation coefficients in the first look-up table; and (a3) respectively multiplying the N original gray levels of the N pixels in the ith horizontal line by the ith compensation coefficient to generate N compensated gray levels for the N pixels in the ith horizontal line; and after said step (a), selecting a maximum compensation coefficient from the M compensation coefficients corresponding to the M horizontal lines, and respectively dividing each compensated gray level of the pixels in the input image by the maximum compensation coefficient;

whereby the input image is adjusted.

2. The method of claim 1, wherein the display system is a plasma display panel (PDP).

3. The method of claim 1, wherein in the sub-step (a1), the ith loading is calculated by summing up the N original gray levels of the N pixels in the ith horizontal line.

4. The method of claim 1, wherein the display system is a P-bits display system, the plural compensation coefficients comprises ($2^P$*N) compensation coefficients, and P is a positive integer.

5. The method of claim 1, wherein each pixel in the input image is selectively a red pixel, a green pixel, or a blue pixel.

6. The method of claim 5, wherein a second look-up table is used for storing a plurality of sets of balancing coefficients related to the characteristics of said display system, each set of the balancing coefficients comprises a red balancing coefficient, a green balancing coefficient, and a blue balancing coefficient.

7. The method of claim 6, said step (a) further comprising the sub-steps of:

(a4) based on the ith loading, selecting an ith set of balancing coefficients corresponding to the ith loading from the plurality of sets of balancing coefficients in the second look-up table; and (a5) respectively multiplying the compensated gray levels of the red pixels in the ith horizontal line by the red balancing coefficient in the ith set of balancing coefficients, respectively multiplying the compensated gray levels of the green pixels in the ith horizontal line by the green balancing coefficient in the ith set of balancing coefficients, and respectively multiplying the compensated gray levels of the blue pixels in the ith horizontal line by the blue balancing coefficient in the ith set of balancing coefficients.

8. The method of claim 1, wherein before said step (a) is performed, the following step is performed:

(b) performing a reverse Gamma conversion on the original gray level of each pixel in the input image.

9. The method of claim 8, wherein after said step (a) is performed, the following step is performed:

(c) performing a brightness linearity Gamma conversion on the compensated gray level of each pixel in the input image.

10. The method of claim 1, wherein after said step (a) is performed, the following step is performed:

(e) respectively performing an error diffusion process on each compensated gray level of the pixels in the input image.

11. An apparatus for adjusting an input image on the basis of characteristics of a display system, said input image comprising M horizontal lines, each of the M horizontal lines respectively comprising N pixels, M and N being positive integers, each pixel in the input image having an original gray level, said apparatus comprising:

a first look-up table for storing a plurality of compensation coefficients related to the characteristics of said display system;

a compensating module for processing the ith horizontal line among the M horizontal lines, i being an integer index ranging from 1 to M, the compensating module comprising:

a loading calculating unit for calculating an ith loading corresponding to the ith horizontal line according to the N original gray levels of the N pixels in the ith horizontal line;

a first selecting unit for selecting an ith compensation coefficient corresponding to the ith loading from the plurality of compensation coefficients in the first look-up table; and a first multiplying unit for respectively multiplying the N original gray levels of the N pixels in the ith horizontal line by the ith compensation coefficient to generate N compensated gray levels for the N pixels in the ith horizontal lines; and a contrast extending module for selecting a maximum compensation coefficient from the M compensation coefficients corresponding to the M horizontal lines and respectively dividing each compensated gray level of the pixels in the input image by the maximum compensation coefficient.

12. The apparatus of claim 11, wherein the display system is a plasma display panel (PDP).

13. The apparatus of claim 11, wherein the loading calculating unit generates the ith loading by summing up the N original gray levels of the N pixels in the ith horizontal line.

14. The apparatus of claim 11, wherein the display system is a P-bits display system, the plurality of compensation coefficients comprises $(2^P*N)$ compensation coefficients, and P is a positive integer.

15. The apparatus of claim 11, wherein each pixel in the input image is selectively a red pixel, a green pixel, or a blue pixel.

16. The apparatus of claim 15, said apparatus further comprising:

a second look-up table for storing plural sets of balancing coefficients related to white balance, each set of the balancing coefficients comprising a red balancing coefficient, a green balancing coefficient, and a blue balancing coefficient.

17. The apparatus of claim 16, said apparatus further comprising:

a balancing module coupled to the compensating module and comprising:

a second selecting unit for selecting an ith set of balancing coefficients corresponding to the ith loading from the plural sets of balancing coefficients in the second look-up table; and a second multiplying unit for respectively multiplying the compensated gray levels of the red pixels in the ith horizontal line by the red balancing coefficient in the ith set of balancing coefficients, respectively multiplying the compensated gray levels of the green pixels in the ith horizontal line by the green balancing coefficient in the ith set of balancing coefficients, and respectively multiplying the compensated gray levels of the blue pixels in the ith horizontal line by the blue balancing coefficient in the ith set of balancing coefficients.

18. The apparatus of claim 11, said apparatus further comprising:

a Gamma conversion module for performing a reverse Gamma conversion on the original gray level of each pixel in the input image.

19. The apparatus of claim 18, said apparatus further comprising:

a linearity conversion module for performing a brightness linearity Gamma conversion on the compensated gray level of each pixel in the input image.

20. The apparatus of claim 11, said apparatus further comprising:

an error diffusion module for respectively performing an error diffusion process on each compensated gray level of the pixels in the input image.

* * * * *